United States Patent
Ando

(10) Patent No.: US 9,829,569 B2
(45) Date of Patent: Nov. 28, 2017

(54) CHECKING METHOD AND SYSTEM FOR RADAR DEVICE

(71) Applicant: DENSO CORPORATION, Kariya, Aichi-pref. (JP)

(72) Inventor: Takamasa Ando, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 558 days.

(21) Appl. No.: 14/403,133

(22) PCT Filed: May 21, 2013

(86) PCT No.: PCT/JP2013/064056
§ 371 (c)(1),
(2) Date: Nov. 21, 2014

(87) PCT Pub. No.: WO2013/176118
PCT Pub. Date: Nov. 28, 2013

(65) Prior Publication Data
US 2015/0138012 A1    May 21, 2015

(30) Foreign Application Priority Data

May 24, 2012    (JP) .................................. 2012-118470

(51) Int. Cl.
*G01S 7/40*    (2006.01)
*G01S 13/93*    (2006.01)
(Continued)

(52) U.S. Cl.
CPC .......... *G01S 7/4004* (2013.01); *G01S 7/4026* (2013.01); *G01S 13/931* (2013.01); *H01Q 1/125* (2013.01);
(Continued)

(58) Field of Classification Search
CPC .... G01S 7/4004; G01S 7/4026; G01S 13/931; G01S 2007/027; G01S 2013/9375;
(Continued)

(56) References Cited

U.S. PATENT DOCUMENTS

| 6,157,294 A * | 12/2000 | Urai .......................... B60Q 1/52 |
| | | 307/10.1 |
| 2003/0090408 A1* | 5/2003 | Matsuura .............. G01S 7/4811 |
| | | 342/70 |

(Continued)

FOREIGN PATENT DOCUMENTS

| JP | H09250970 A | 9/1997 |
| JP | 3995500 B2 | 8/2007 |

(Continued)

OTHER PUBLICATIONS

International Search Report (in Japanese with English Translation) for PCT/JP2013/064056, dated Jun. 25, 2013; ISA/JP.

(Continued)

*Primary Examiner* — Timothy A Brainard
*Assistant Examiner* — Nuzhat Pervin
(74) *Attorney, Agent, or Firm* — Harness, Dickey & Pierce, P.L.C.

(57) ABSTRACT

A first step sets a second inclination angle of a housing to an angle different from a reference housing angle by a limit angle; drives an actuator to set a first inclination angle to an angle different from a substrate inclination angle by the limit angle such that a beam axis is kept to be oriented to a specified direction; and measures, based on transmission and reception of a radar beam, first received power. A second step drives the actuator to set the first inclination angle to an angle located outside the adjustment range by a predetermined additional angle while the first inclination angle is maintained; and measures, based on transmission and recep- (Continued)

tion of the radar beam, second received power. A third step determines whether a difference between the first received power and the second received power is greater than a predetermined determination threshold, and checks an operating state of the actuator based on a result of the determination.

3 Claims, 6 Drawing Sheets

(51) Int. Cl.
- *H01Q 1/12* (2006.01)
- *H01Q 1/32* (2006.01)
- *H01Q 3/08* (2006.01)
- *H01Q 19/10* (2006.01)
- *G01S 7/02* (2006.01)

(52) U.S. Cl.
CPC ............ *H01Q 1/3233* (2013.01); *H01Q 3/08* (2013.01); *H01Q 19/106* (2013.01); *G01S 2007/027* (2013.01); *G01S 2013/9375* (2013.01)

(58) Field of Classification Search
CPC .... G01S 7/4811; G01S 13/428; G01S 17/936; G01S 17/42; G01S 7/003; G01S 13/22; G01S 13/93; H01Q 1/125; H01Q 1/3233; H01Q 3/08; H01Q 19/106; B60Q 1/52; B64C 1/22
USPC ........................................................ 342/173
See application file for complete search history.

(56) References Cited

U.S. PATENT DOCUMENTS

| | | | | |
|---|---|---|---|---|
| 2003/0150956 A1* | 8/2003 | Salmon | ..................... | B64C 1/22 244/120 |
| 2003/0184471 A1 | 10/2003 | Tohyama et al. | | |
| 2011/0050525 A1 | 3/2011 | Sanada et al. | | |
| 2012/0127024 A1* | 5/2012 | Takashima | ............ | G01S 13/428 342/146 |
| 2012/0187283 A1* | 7/2012 | Yamada | ................ | G01S 17/936 250/234 |
| 2012/0249996 A1* | 10/2012 | Tanaka | .................... | G01S 17/42 356/4.01 |
| 2016/0070000 A1* | 3/2016 | Takasuka | ................ | G01S 7/003 356/5.01 |

FOREIGN PATENT DOCUMENTS

| | | | | | |
|---|---|---|---|---|---|
| JP | 2008145177 A | * | 6/2008 | ............. | G01S 13/22 |
| JP | 2008145177 A | | 6/2008 | | |
| JP | 2008175713 A | * | 7/2008 | ............. | G01S 13/93 |
| JP | 2008175713 A | | 7/2008 | | |
| JP | 2008249630 A | | 10/2008 | | |
| JP | 2010096588 A | | 4/2010 | | |
| JP | 2010103731 A | | 5/2010 | | |
| JP | 2011047722 A | * | 3/2011 | ............. | G01S 13/93 |
| JP | 2011047722 A | | 3/2011 | | |
| JP | 2011058817 A | * | 3/2011 | ............. | G01S 13/93 |
| JP | 2011058817 A | | 3/2011 | | |

OTHER PUBLICATIONS

International Preliminary Report on Patentability (in Japanese with English Translation) for PCT/JP2013/064056, dated Nov. 25, 2014; ISA/JP.

* cited by examiner

CHECKING METHOD AND SYSTEM FOR RADAR DEVICE

TECHNICAL FIELD

The present invention relates to methods and systems for checking operations of a radar device that is capable of mechanically adjusting a beam axis defined by the direction of a main beam from an antenna; the direction of the main beam means the direction of an optical axis, i.e. the center axis, of the main beam.

BACKGROUND ART

For running safety of a vehicle, there are used radar devices for detecting objects around the vehicle. In order to ensure the detection accuracy of a radar device, it is necessary to adjust the direction of a main beam defined by the direction of a main beam, i.e. a main lobe, before shipment of the radar device or at installation of the radar device into a vehicle body.

In order to make such adjustment possible without manual work, there is a radar device capable of driving an actuator to change the inclination angle of an antenna substrate with respect to the housing of the radar device (see patent document 1); the antenna substrate means a substrate on which an antenna is formed. Specifically, the direction of the beam axis with respect to a beam output surface, i.e. a beam transmitting surface, on the antenna substrate is determined. For this reason, changing the inclination angle of the beam output surface of the antenna substrate with respect to the housing of the radar device enables adjustment of the direction of the beam axis.

Such a radar device is equipped with an inclination sensor for measuring the inclination angle of the beam output surface of the antenna substrate. The radar device is configured to control the operating quantity of the actuator according to the result of the measured results of the inclination sensor, thus adjusting the inclination angle of the beam output surface of the antenna substrate, i.e. adjusting the direction of the beam axis.

CITATION LIST

Patent Document

[Patent Document 1] Japanese Patent Laid-Open No. 2011-047722

SUMMARY OF INVENTION

Technical Problem

The aforementioned radar device is capable of adjusting the inclination angle of the beam output surface of the antenna substrate using the actuator. In such a radar device, it is necessary to check whether the actuator is operating normally over a desired range corresponding to an adjustable range of the inclination angle of the beam output surface of the antenna substrate before shipment or the like. It is possible to perform such a check based on the relationship between the operating quantities of the actuator and the measurement results from the inclination sensor previously measured.

However, if the inclination sensor is not installed in the radar device, it may be difficult to use the aforementioned checking method using the measurement result from the inclination sensor.

In view of the circumstances set forth above, one aspect of the present invention aims to provide a checking method and a system, which are capable of checking whether an actuator for changing the direction of the beam axis of a radar device is operating normally over a desired range without using inclination sensors.

Means for Solving Problem

A checking method according to an exemplary aspect of the present invention is for a radar device as a checking target. The radar device includes an antenna substrate having a beam transmitting surface on which an antenna having a predetermined beam axis is formed. The radar device includes a housing in which the antenna substrate is installed, the housing having a first reference surface having a predetermined positional relationship with respect to a predetermined checking reference surface. The housing supports the antenna substrate such that a first inclination angle of the beam transmitting surface with respect to the first reference surface is changeable. The radar device includes an actuator installed in the housing and configured to change the first inclination angle to change an orientation of the beam axis of the antenna along a direction defined relative to the checking reference surface. The radar device includes a measuring unit that transmits a radar beam via the beam transceiver surface of the antenna substrate, and receives a reflected beam based on the transmitted radar beam to measure received power.

The checking method according to the exemplary aspect of the present invention is a method for checking whether the actuator operates over an operating range corresponding to a predetermined adjustment range for the first inclination angle. The checking method includes a step of providing checking equipment. The checking equipment includes a housing support. The housing support is configured to support the housing such that a second inclination angle of the first reference surface with respect to a second reference surface is changeable, and change the second inclination angle to change the orientation of the beam axis along a direction defined relative to the second reference surface. The second reference surface is defined as a surface substantially parallel to the first reference surface when the first reference surface is substantially perpendicular to the checking reference surface. The checking equipment includes a reflector configured to reflect the transmitted radar beam and located to maximize the received power measured by the measuring unit based on a reflected radar beam when the beam axis of the radar device supported by the housing support is oriented to a specified direction.

A value of the first inclination angle, at which the beam axis is oriented to the specified direction when the second inclination angle is set to a predetermined reference housing angle, is defined as a reference substrate angle. A value of the first inclination angle of the antenna substrate corresponding to a limit of the adjustment range is defined as a limit angle.

A first step of the method according to the exemplary embodiment sets the second inclination angle of the housing to an angle different from the reference housing angle by the limit angle. The first step drives the actuator to set the first inclination angle to an angle different from the substrate inclination angle by the limit angle such that the beam axis is kept to be oriented to the specified direction. The first step transmits, by the measuring unit, a radar beam via the beam transceiver surface and receives a reflected beam based on the transmitted radar beam to thereby measure first received power.

A second step of the method according to the exemplary embodiment drives the actuator to set the first inclination angle to an angle located outside the adjustment range by a predetermined additional angle while the first inclination angle of the antenna substrate is maintained. The second step transmits, by the measuring unit, a radar beam via the beam transceiver surface and receives a reflected beam based on the transmitted radar beam to thereby measure second received power.

A third step of the method according to the exemplary embodiment determines whether a difference between the first received power as a measurement result from the first step and the second received power as a measurement result from the second step is greater than a predetermined determination threshold. The third step checks an operating state of the actuator based on a result of the determination.

Specifically, if the actuator is operating normally, the orientation of the beam axis is substantially identical to the specified direction in the first step. If the actuator is operating normally, the orientation of the beam axis is shifted from the specified direction by the additional angle. A measurement result from the measuring unit is maximized when the orientation of the beam axis is identical to the specified direction. A measurement result from the measuring unit is reduced with an increase of an angle of the beam axis with respect to the specified direction. Thus, in the third step, it is possible to determine that the actuator is operating normally at the limit within the adjustment range for the substrate inclination angle when the difference between both the measurement results is greater than the determination threshold.

As described above, the checking method according to the exemplary aspect of the present invention makes it possible to perform, without using an inclination sensor, checking of whether the actuator, which changes the first inclination angle with respect to the first reference surface of the beam transmitting surface of the antenna substrate, is operating normally.

A checking system according to another exemplary aspect of the present invention is a checking system for a radar device as a checking target. The radar device includes an antenna substrate having a beam transmitting surface on which an antenna having a predetermined beam axis is formed. The radar device includes a housing in which the antenna substrate is installed, the housing having a first reference surface having a predetermined positional relationship with respect to a predetermined checking reference surface. The housing supports the antenna substrate such that a first inclination angle of the beam transmitting surface with respect to the first reference surface is changeable. The radar device includes an actuator installed in the housing and configured to change the first inclination angle to change an orientation of the beam axis of the antenna along a direction defined relative to the checking reference surface. The radar device includes a measuring unit that transmits a radar beam via the beam transceiver surface of the antenna substrate, and receives a reflected beam based on the transmitted radar beam to measure received power. The checking system checks whether the actuator operates over an operating range corresponding to a predetermined adjustment range for the first inclination angle.

The checking system includes a housing support configured to support the housing such that a second inclination angle of the first reference surface with respect to a second reference surface is changeable, and change the second inclination angle to change the orientation of the beam axis along a direction defined relative to the second reference surface. The second reference surface is defined as a surface substantially parallel to the first reference surface when the first reference surface is substantially perpendicular to the checking reference surface. The checking system includes a reflector configured to reflect the transmitted radar beam and located to maximize the received power measured by the measuring unit based on a reflected radar beam when the beam axis of the radar device supported by the housing support is oriented to a specified direction. A value of the first inclination angle, at which the beam axis is oriented to the specified direction when the second inclination angle is set to a predetermined reference housing angle, is defined as a reference substrate angle. A value of the first inclination angle of the antenna substrate corresponding to a limit of the adjustment range is defined as a limit angle. The checking system includes a first measuring module that sets the second inclination angle of the housing to an angle different from the reference housing angle by the limit angle. The first measuring module drives the actuator to set the first inclination angle to an angle different from the substrate inclination angle by the limit angle such that the beam axis is kept to be oriented to the specified direction. The first measuring module transmits, by the measuring unit, a radar beam via the beam transceiver surface and receives a reflected beam based on the transmitted radar beam to thereby measure first received power. The checking system includes a second measuring module that drives the actuator to set the first inclination angle to an angle located outside the adjustment range by a predetermined additional angle while the first inclination angle of the antenna substrate is maintained. The second measuring module transmits, by the measuring unit, a radar beam via the beam transceiver surface and receives a reflected beam based on the transmitted radar beam to thereby measure second received power. The checking system includes a checking module that determines whether a difference between the first received power as a measurement result from the first step and the second received power as a measurement result from the second step is greater than a predetermined determination threshold. The checking module checks an operating state of the actuator based on a result of the determination.

The checking system performs the first step, the second step, and the third step of the radar checking method according to the exemplary aspect of the present invention by the respective first measuring module, second measuring module, and checking module. For this reason, like the checking method, it is possible to perform, without using an inclination sensor, checking of whether the actuator, which changes the first inclination angle with respect to the first reference surface of the beam transmitting surface of the antenna substrate, is operating normally.

DESCRIPTION OF EMBODIMENT

An embodiment of the present invention will be described hereinafter with reference to accompanying drawings.

In the embodiment, a radar device checking system controls an actuator to thereby perform checking of a radar device 1; the actuator serves to adjust an axis of a radar beam output from the radar device 1 via an antenna.

<Overall Structure>

Figure 1:
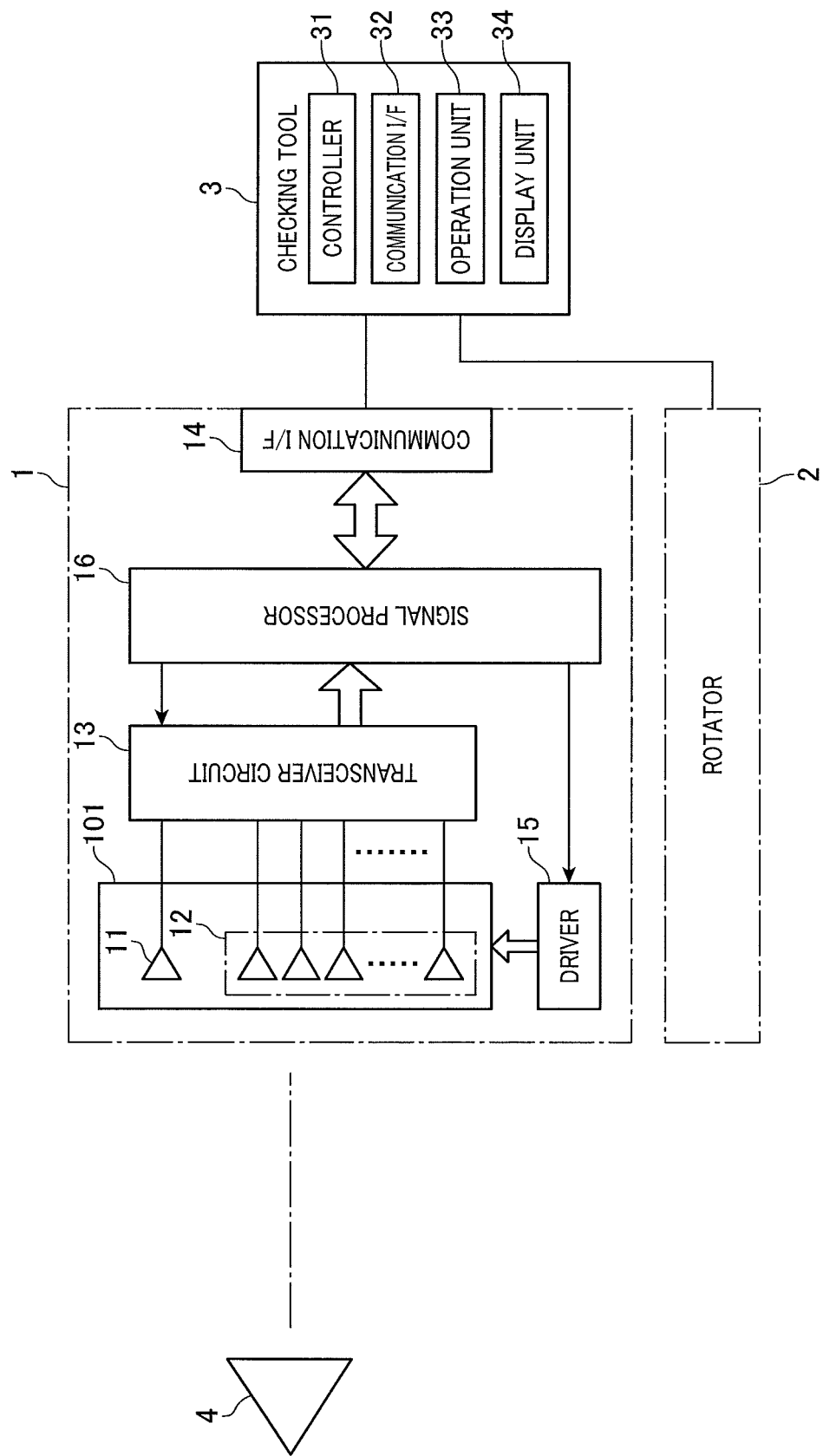
FIG. 1 is a block diagram illustrating an overall structure of a checking system according to an embodiment of the present invention.

Referring to FIG. 1, the radar checking system includes the radar device 1 as a check target, a rotator 2, a checking tool 3, and a reflector 4. The radar device 1 is fixed to the rotator 2. The rotator 2 is configured to change an inclination angle of the radar device 1 with respect to a predetermined equipment reference surface corresponding to a first reference surface. The checking tool 3 controls operations of the radar device 1 and the rotator 2 to thereby perform checking of the radar device 1. The reflector 4 is installed to have a predetermined positional relationship with respect to the radar device 1 fixedly installed on the rotator 2.

Note that, as the equipment reference surface, a surface parallel to a horizontal surface or an installation surface on which the rotator 2 is installed is for example used. For example, in FIG. 1, an installation surface on which the rotator 2 is installed is used as the equipment reference surface. The rotator 2 and the reflector 4 are collectively referred to as checking equipment.

<Radar Device>

The radar device 1 includes a transmitting antenna 11, and a receiving antenna 12. The transmitting antenna 11 is operative to transmit, according to a transmission signal, radar waves consisting of electromagnetic waves within a millimeter wave band, i.e. radar beams. The radar beams are frequency-modulated continuous-wave beams according to the first embodiment. The receiving antenna 12 consists of a plurality of antenna elements that receive radar beams.

The radar device 1 includes a transceiver circuit 13, and a communication interface (communication I/F) 14. The transceiver circuit 13 is operative to (i) Produce the transmission signal to be supplied to the transmitting antenna 11

(ii) Produce a beat signal based on a signal received by the receiving antenna 12

(iii) Measure an intensity of the signal received by the receiving antenna 12.

The beat signal is comprised of a frequency component equivalent to the difference in frequency between the received signal and the transmission signal.

The communication I/F 14 is operative to communicate with external devices, such as the checking tool 3.

The radar device 1 includes a driver 15. The driver 15 is provided with an actuator 103 (see FIG. 2).

The actuator 103 is configured to

1. Change the direction of a radar beam to be transmitted from the transmitting antenna 11, i.e. the direction of a main beam to be transmitted from the transmitting antenna 11

2. Change the direction of a radar-beam axis to be received in the receiving antenna 12, i.e. the direction of a main beam for the receiving antenna 12.

The direction of the main beam output from the transmitting antenna 11 means the center axis of the main beam, in other words, the direction of the beam axis. Specifically, the direction of the main beam output from the transmitting antenna 11 is a direction in which a corresponding level of transmitting gain is maximized. The direction of the main beam for the receiving antenna 12 means the center axis of the main beam, in other words, the direction of the electromagnetic axis. Specifically, the direction of the main beam for the receiving antenna 12 is a direction in which a corresponding level of receiving gain is maximized.

Note that the beam axis of the radar device 1 according to this embodiment is defined as at least any one of (1) The direction of the main beam to be transmitted from the transmitting antenna 11

(2) The direction of the main beam for the receiving antenna 12

(3) The direction of a peak level in the total gain of the transmitting gain of the transmitting antenna 11 and the receiving gain of the receiving antenna 12.

The radar device 1 includes a signal processor 16. The signal processor 16 is operative to perform various tasks using the transceiver circuit 13 and the driver 15 according to instructions input thereto via the communication I/F 14, and output the execution results of the tasks via the communication I/F 14.

Note that the transmitting antenna 11 and the receiving antenna 12 are designed as a planer antenna. That is, the transmitting antenna 11 and the receiving antenna 12 are formed on a common substrate, referred to as an antenna substrate. In addition, in this embodiment, a normal direction to the surface of the antenna substrate 101 on which the antennas are formed, i.e. a beam transceiver surface 101a, is designed to match with the direction of the beam axis of the antenna substrate 101.

Figure 2:
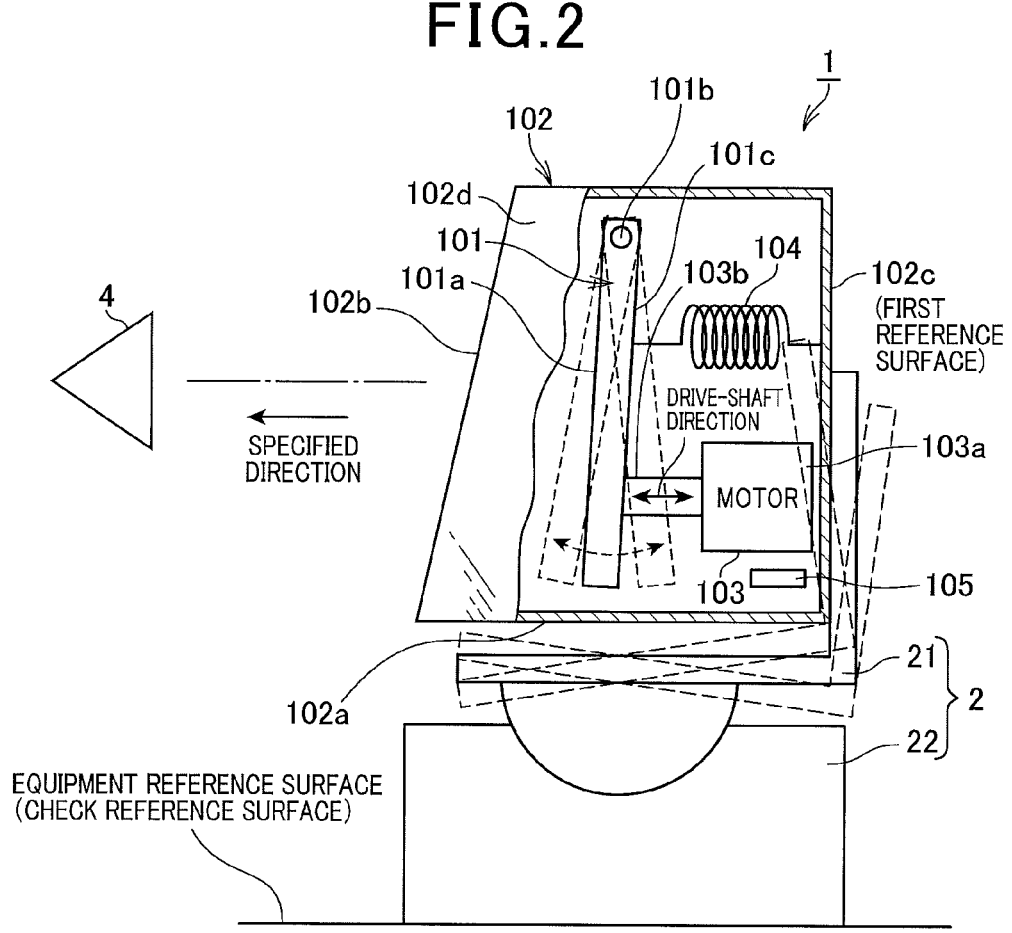
FIG. 2 is a view illustrating schematic structures and operations of movable portions of a radar device and a rotator illustrated in FIG. 1.

Referring to FIG. 2, a housing 102 has a rectangular parallelepiped shape, i.e. a box shape. The housing 102 is supported by the rotator 2 such that, in a reference positional state, a sidewall 102a of the housing 102 faces the equipment reference surface. The antenna substrate 101 is installed in the housing 102 such that the beam transceiver surface 101a faces a sidewall 102b of the housing 102; the sidewall 102b is, for example, an opening wall. Radar beams transmitted from the transmitting antenna 11 are output via the sidewall, i.e. the opening, 102b, and radar beams reflected from objects and the like are received by the receiving antenna 12.

A sidewall 102c of the housing 102, which is opposite to the sidewall 102b, is substantially perpendicular to the equipment reference surface in the reference positional state of the housing 102 in which the sidewall 102a faces the equipment reference surface.

A supporting pole 101b is attached to the tops of the inner surfaces of sidewalls 102d as another pair of sidewalls of the housing 102 in parallel to the equipment reference surface. The top portion of the antenna substrate 101 is swingably supported by the supporting pole 101b serving as a swinging shaft such that the bottom portion of the antenna substrate 101 is close to or away from the sidewall 102c.

Specifically, the antennal substrate 101 is configured such that the inclination angle of the beam transceiver surface 101a with respect to the sidewall 102c of the housing 102, i.e. the direction of the axis of a radar beam from or to the antenna substrate 101, is changeable in a vertical direction with respect to the equipment reference surface. The direction of the axis of a radar beam from or to the antenna substrate 101 means the axis of a radar beam to be transmitted from the antenna substrate 101 and the axis of a radar beam to be received by the antenna substrate 101.

Note that, in this embodiment, the antenna elements constituting the receiving antenna 12 are aligned in an array, and the direction of the alignment matches with the opposite direction of the pair of sidewalls 102d. The opposite direction of the pair of sidewalls 102d matches with a depth direction perpendicular to the surface of FIG. 2. The antenna elements are also configured such that the axis of a beam to be received is changeable in the top and bottom directions of the housing 102.

In this embodiment, a surface parallel to the sidewall 102c while the sidewall 102c is perpendicular to the equipment reference surface, for example, a surface along the sidewall 102c serves as a second reference surface.

The radar device 1 is provided with an actuator 103 constituting the driver 15, a biasing member 104, and a control substrate 105. In the control substrate 105, the signal processor 16 and the communication I/F 14 are installed. These structural elements 103, 104, and 105 are disposed in the housing 102.

In this embodiment, the actuator 103 is equipped with a commonly available linear stepping motor 103a. The stepping motor 103 is located between a back surface 101c of the antenna substrate 101, which is opposite to the beam transceiver surface 101a, and the sidewall 102c of the housing 102. The actuator 103 is also equipped with a drive shaft 103b. The drive shaft 103b has one end in abutment with the back surface 101c of the antenna substrate 101, and is movable in a direction perpendicular to the sidewall 102c. Specifically, the motor 103a is capable of moving the drive shaft 103b in the direction, referred to as a drive-shaft direction, perpendicular to the sidewall 102c. A spring is attached to an upper portion of the back surface 101c of the antenna substrate 101. The spring is configured to bias the antenna substrate 101 toward a direction to bring the antenna substrate 101 to be in abutment with the drive shaft 103b of the actuator 103, i.e. toward a direction to bring the antenna substrate 101 to be close to the sidewall 102c. The spring causes the back surface 101c of the antenna substrate 101 to be always in abutment with one end of the drive shaft 103a.

Specifically, an amount of displacement of the drive shaft 103b of the actuator 103 in the drive-shaft direction, i.e. the number of drive steps of the stepping motor 103a, matches with an amount of the antenna surface 101 being driven by the actuator 103. The amount of the antenna surface 101 being driven by the actuator 103 will be referred to as an actuator-drive amount. The antenna substrate 101 is configured such that the inclination angle with respect to the sidewall 102c of the housing 102 changes according to the actuator-drive amount.

Hereinafter, the inclination angle of the beam transceiver surface 101a of the antenna substrate 101 with respect to the vertical direction defined relative to the equipment installation surface of the housing 102 will be referred to as a substrate inclination angle. The vertical direction defined relative to the equipment installation surface of the housing 102 will be referred to as a housing vertical direction.

A value of the substrate inclination angle, at which the beam transceiver surface 101a of the antenna substrate 101 is in agreement with the housing vertical direction, i.e. is parallel to the housing vertical direction, will be referred to as a reference substrate angle.

An angular range within which the substrate inclination angle is adjustable will be referred to as an adjustment range.

The adjustment range is set to be narrower than an angular range of the substrate inclination angle matching with the movable range of the drive shaft 103b of the actuator 103. In this embodiment, the adjustment range is set to be ±θ1 with respect to the reference substrate angle; θ1 will be referred to as a limit angle. A plus value of the substrate inclination angle means an angle at which the beam transceiver surface 101a is close to the opening sidewall 102b with respect to the reference inclination angle. A minus value of the substrate inclination angle means an angle at which the beam transceiver surface 101a is close to the sidewall 102c with respect to the reference inclination angle. In other words, the direction based on a plus value of the substrate inclination angle results in the beam axis of the antenna substrate 101 changing downward. The direction of a minus value of the substrate inclination angle results in the beam axis of the antenna substrate 101 changing downward.

Returning to FIG. 1, when receiving, via the communication I/F 14, an instruction to execute a normal operation, the signal processor 16 is operative to cyclically activate the transceiver circuit 13, and sample the beat signals supplied from the transceiver circuit, thus performing frequency analysis of the samples. Based on results of the frequency analysis, the signal processor 16 outputs information associated with objects that reflect radar waves via the communication I/F 14; the information includes distance, relative velocity, orientation, and the like.

When receiving, via the communication I/F 14, an instruction to execute a check operation, the signal processor 16 is operative to drive the driver 15 according to an actuator-drive amount specified by the instruction, and activate the transceiver circuit 13 to obtain measurement results of an intensity of the received signals. Then, the signal processor 16 outputs, via the communication I/F 14, the measurement results of the intensity of the received signals. The measurement results of the intensity of the received signals include an average power level in all the power levels received by all the antenna elements of the receiving antenna 12, or a total power level of all the power levels received by all the antenna elements of the receiving antenna 12.

<Rotator>

Referring to FIG. 2, the rotator 2 is a commonly available one that is comprised of a support 21 to which the radar device 1 is fixedly supported, and a base 22 that swingably supports the support 21; an actuator or the like for swinging the support 21 is installed in the base 22.

The support 21 is swingable along a predetermined plane perpendicular to each of the equipment reference surface and the support pole 101b, in other words, along the swinging direction of the beam transceiver surface 101a of the antenna substrate 101.

Hereinafter, the inclination angle of the sidewall 102c of the housing 102, whose radar device 1 fixed to the support 21, with respect to a direction perpendicular to the equipment reference surface along the predetermined plane will be referred to as a housing inclination angle. A value of the housing inclination angle, at which the sidewall 102c is in agreement with the direction perpendicular to the equipment reference surface will be referred to as a reference housing angle.

In this embodiment, when the housing inclination angle is set to the reference housing angle, and the substrate inclination angle of the radar device 1 fixed to the support 21 is set to the reference substrate angle, the direction of the beam axis of the beam transceiver surface 101a is in agreement with a specified direction previously determined based on the equipment reference surface.

The specified direction means a direction that permits the radar device 1 installed in the vehicle body to efficiently detect objects as detection targets. The specified direction is previously determined based on experiments and the like.

Note that FIG. 2 is a schematic view for understanding the structure and operations of the rotator 2. Actually, the distance between the reflector 4 and the antenna substrate 101 of the radar apparatus 1 fixedly supported by the support 21 is unchanged and the rotational axis of the antenna substrate 101 and the rotational axis of the rotator 2 are in agreement with each other even if the rotator 2 swings the support 21.

<Reflector>

The reflector 4 is an available one comprised of a reflection member that reflects radar waves, radar beams, irradiated from the radar device 1. The reflector 4 is located at a position where the intensity of the received signals, i.e. the intensity of echoes from the reflector, is maximized.

Returning to FIG. 1, the checking tool 3 is mainly comprised of a microcomputer. The checking tool 3 includes a controller 31, a communication interface (I/F) 32, an operation unit 33, and a display unit 34.

The controller 31 performs overall control of the respective units of the checking tool 3. The communication I/F 32 performs communications with the radar device 1. The operation unit 33 includes various operation keys, and accepts information input via the various operation keys. The display unit 34 displays, according to the information accepted by the operation unit 33, information obtained from the radar device 1 or another information.

Figure 3:
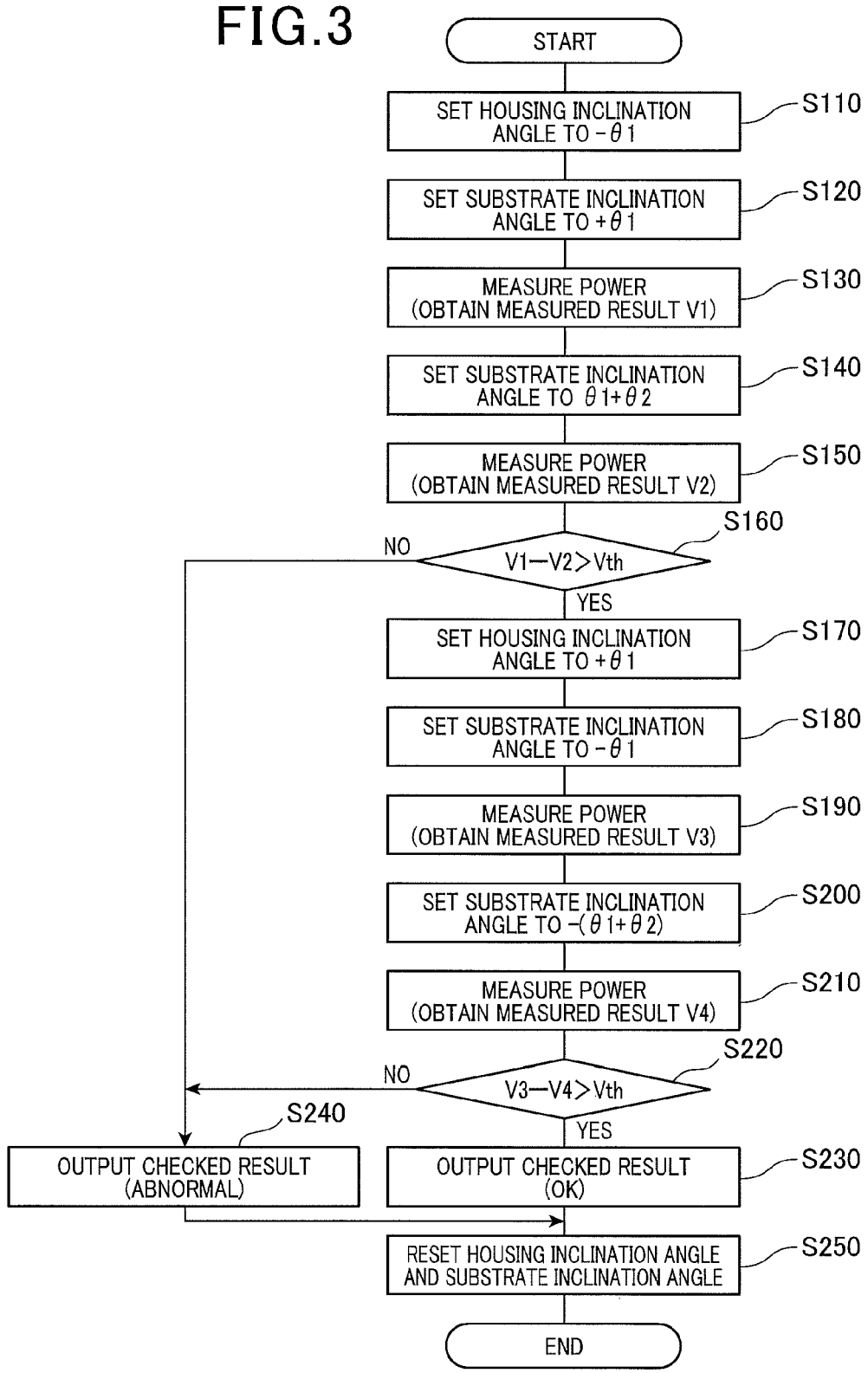
FIG. 3 is a flowchart schematically illustrating an actuator checking task according to the embodiment.

A radar-device checking task, i.e. an actuator checking task, executed by the controller 31 of the checking tool 3 will be described hereinafter in accordance with the flowchart illustrated in FIG. 3.

Note that the task is activated when a predetermined operation is carried out via some operation keys of the operation unit 33. Like the substrate inclination angle, the direction based on a plus value of the housing inclination angle results in the beam axis of the antenna substrate 101 changing downward. The direction of a minus value of the housing inclination angle results in the beam axis of the antenna substrate 101 changing upward.

When the task is activated, the controller 31 drives the rotator 2 to set the housing inclination angle to $-\theta 1$ first in step S110. Next, the controller 31 drives the actuator 103 via the signal processor 16 and so on, thus setting the substrate inclination angle to $+\theta 1$ in step S120.

This cancels out the change in the direction of the radar beam axis by the housing inclination angle against the change in the direction of the beam axis by the substrate inclination angle. This results in the beam axis of the beam transceiver surface 101a being oriented toward the specified direction.

In this state, the controller 31 outputs, to the signal processor 16, an instruction to instruct the transceiver circuit 13 to measure received power in step S130. This results in a measured result, i.e. received power V1 (see FIG. 6), being obtained via the receiving antenna 12, the transceiver circuit 13, and the signal processor 16. The controller 31 obtains the measured result V1 from the signal processor 16 in step S130.

Based on the operations in steps S110 and S120, a first step of obtaining the measured result, i.e. received power, V1 has been completed.

Next, the controller 31 drives the actuator 103 via the signal processor 16 and so on to set the substrate inclination angle to the sum of $\theta 1$ and $\theta 2$, i.e. $\theta 1+\theta 2$, while keeping the housing inclination angle to $-\theta 1$ in step S140. Note that $\theta 2$ represents an additional angle that can be set within the range drivable by the actuator 103.

In this state, the controller 31 outputs, to the signal processor 16, an instruction to instruct the transceiver circuit 13 to measure received power in step S150. This results in a measured result, i.e. received power V2 (see FIG. 6), being obtained via the receiving antenna 12, the transceiver circuit 13, and the signal processor 16. The controller 31 obtains the measured result V2 from the signal processor 16 in step S150.

Based on the operations in steps S140 and S150, a second step of obtaining the measured result, i.e. received power, V2 has been completed.

Figure 4:
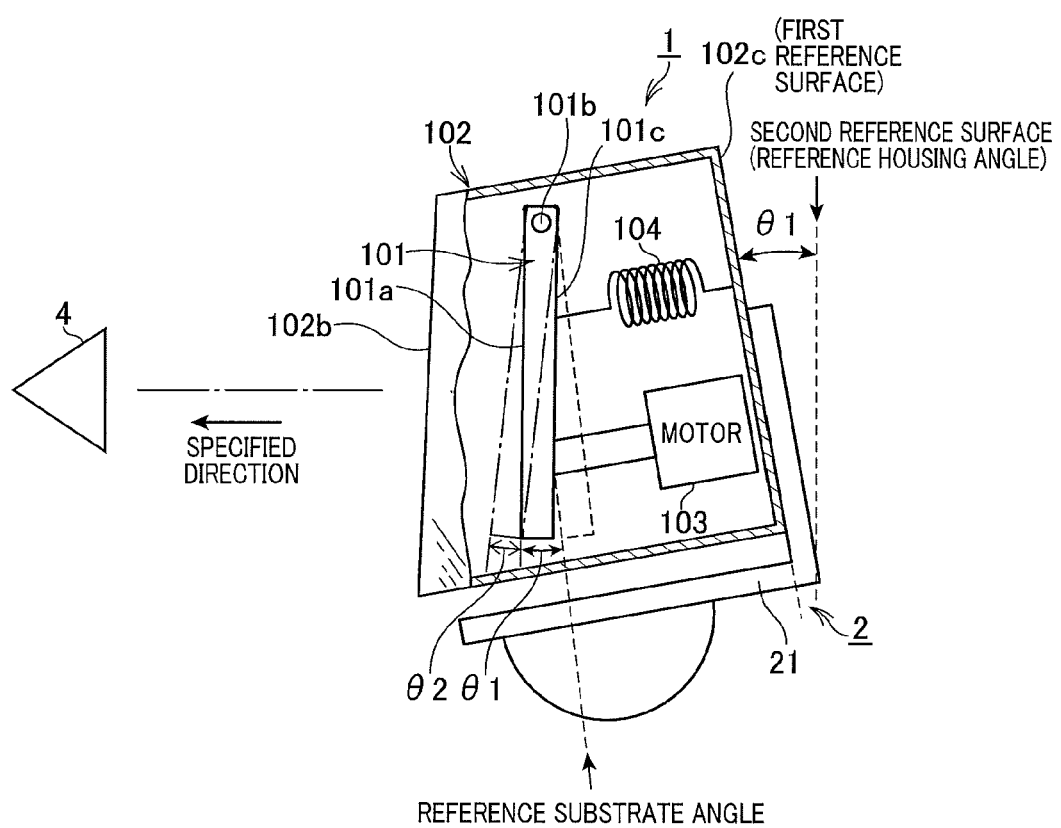
FIG. 4 is a view schematically illustrating a state of each of the radar device and the rotator when the actuator checking task is performed.

FIG. 4 illustrates the state where the housing inclination angle is set to $-\theta 1$. In FIG. 4, the dashed line of the antenna substrate 101 represents the antenna substrate 101 when the substrate inclination angle is set to the reference substrate angle. In FIG. 4, the solid line of the antenna substrate 101 represents the antenna substrate 101 when the substrate inclination angle is set to $+\theta 1$ at which the measured result V1 is obtained. In FIG. 4, the dashed-dotted line of the antenna substrate 101 represents the antenna substrate 101 when the substrate inclination angle is set to $\theta 1+\theta 2$ at which the measured result V2 is obtained.

Next, the controller 31 serves as a checking module to determine, based on the measured results V1 and V2, whether the difference of the measured result V2 from the measured result V1, which is represented by V1−V2, is greater than a predetermined determination threshold Vth in step S160. Note that the determination threshold Vth is suitably determined based on the relationship between substrate inclination angle and received power (see FIG. 6).

Figure 6:
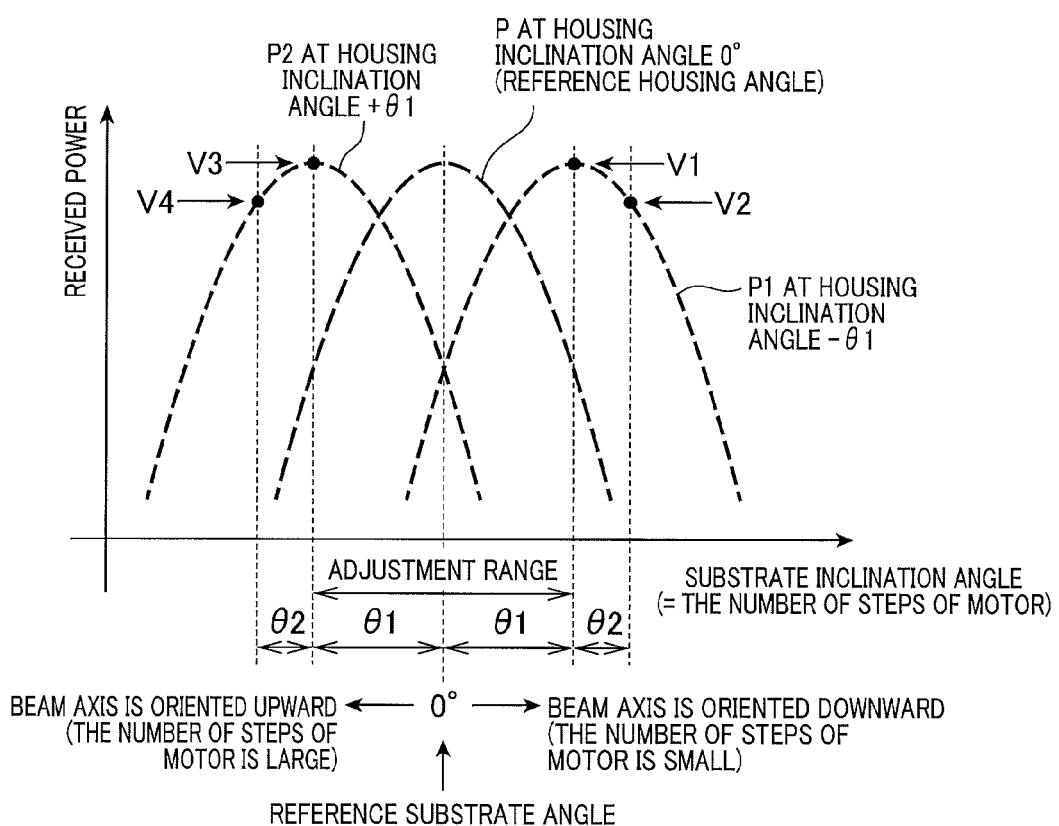
FIG. 6 is a view illustrating a relationship between a substrate inclination angle and received power for each housing inclination angle according to the embodiment.

For example, as illustrated by dashed lines in FIG. 6, when the substrate inclination angle $\theta$ is changed from the reference substrate angle $\theta=0°$ to both a positive (+) direction and to a negative (−) direction while the housing inclination angle is maintained to the reference housing angle, the waveform of the received power P has a parabola shape that is convex upward and has a peak at the reference substrate angle. Specifically, even if the beam axis of the antenna substrate 101 is changed from the specified direction, i.e. the orientation at the reference substrate angle, to an upward direction corresponding to the minus (−) direction of the substrate inclination angle or to a downward direction corresponding to the plus (+) direction of the substrate inclination angle, a corresponding value of the received power P decreases relative to the value of the received power P at the reference substrate angle.

As mentioned above, the measured result V1 is obtained when the beam axis of the antenna substrate 101 is oriented to the specified direction. For this reason, in this state where the beam axis of the antenna substrate 101 is oriented to the specified direction, when the substrate inclination angle $\theta$ is changed to the plus (+) direction and to minus (−) direction, it is expected that received power P1 has a waveform matching with the waveform of the received power P (see FIG. 6).

Thus, if the actuator 103 is operating normally, it is expected that the received power V2, which corresponds to the measured result V2 obtained when the substrate inclination angle is added by $+\theta 2$, decreases relative to the measured result V1 along the curve of the received power P1.

For this reason, determining the determination threshold Vth based on the waveform of the received power P1 makes it possible to determine whether the difference V1−V2 of the measured results is a suitable value, in other words, whether the actuator 103 is operating normally to change the substrate inclination angle by $\theta 2$.

If the determination is affirmative in step S160, it is determined that the actuator 103 is operating normally when the substrate inclination angle is at $+\theta 1$ or thereabout. Then, the controller 31 drives the rotator 2 to set the housing inclination angle to $+\theta 1$ first in step S170. Next, the controller 31 drives the actuator 103 via the signal processor 16 and so on, thus setting the substrate inclination angle to $-\theta 1$ in step S180.

This cancels out the change in the direction of the radar beam axis by the housing inclination angle against the change in the direction of the beam axis by the substrate inclination angle. This results in the beam axis with respect to the equipment reference surface being oriented toward the specified direction.

In this state, the controller 31 outputs, to the signal processor 16, an instruction to instruct the transceiver circuit 13 to measure received power in step S190. This results in a measured result, i.e. received power V3 (see FIG. 6), being obtained via the receiving antenna 12, the transceiver circuit 13, and the signal processor 16. The controller 31 obtains the measured result V3 from the signal processor 16 in step S190.

Based on the operations in steps S170 to S190, a first step of obtaining the measured result, i.e. received power, V3 has been completed.

Next, the controller 31 drives the actuator 103 via the signal processor 16 and so on to set the substrate inclination angle to $-(\theta 1+\theta 2)$ while keeping the housing inclination angle to $+\theta 1$ in step S200.

The operation in step S200 results in the orientation of the beam axis being slightly lower than the specified direction.

In this state, the controller 31 outputs, to the signal processor 16, an instruction to instruct the transceiver circuit 13 to measure received power in step S210. This results in a measured result, i.e. received power V4 (see FIG. 6), being obtained via the receiving antenna 12, the transceiver circuit 13, and the signal processor 16. The controller 31 obtains the measured result V4 from the signal processor 16 in step S210.

Based on the operations in steps S200 and S210, a second step of obtaining the measured result, i.e. received power, V4 has been completed.

Figure 5:
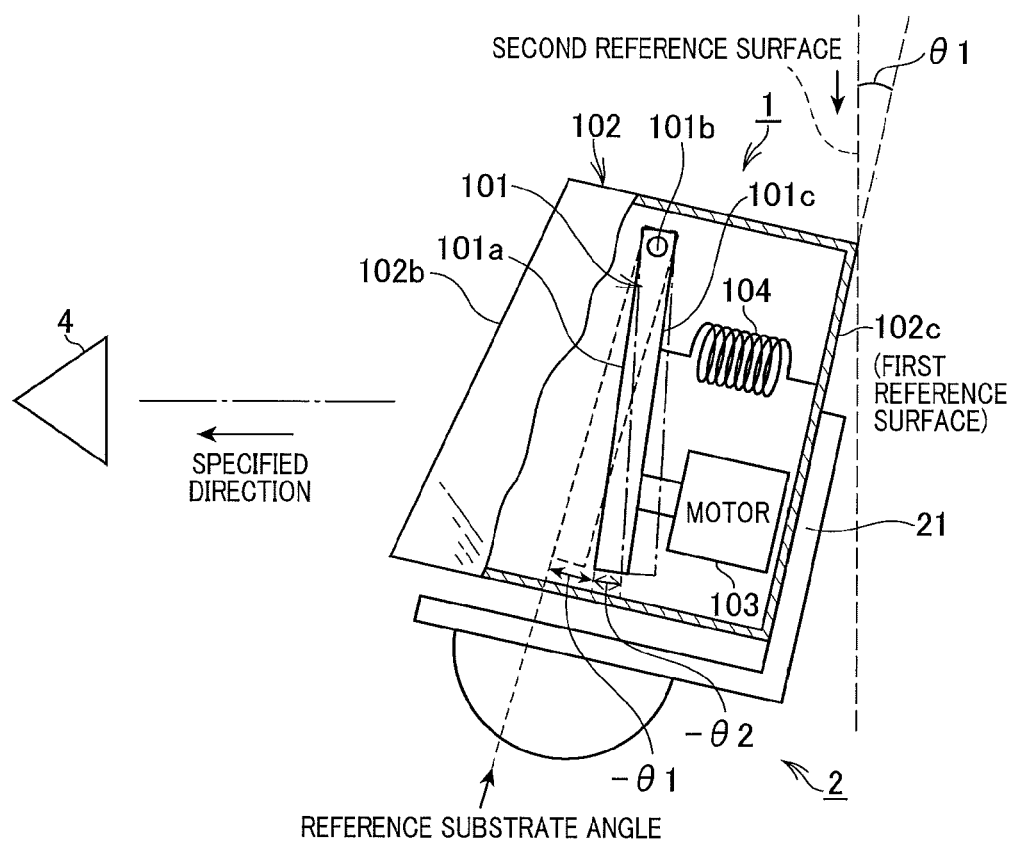
FIG. 5 is a view schematically illustrating another state of each of the radar device and the rotator when the actuator checking task is performed.

FIG. 5 illustrates the state where the housing inclination angle is set to $+\theta 1$. In FIG. 5, the dashed line of the antenna substrate 101 represents the antenna substrate 101 when the substrate inclination angle is set to the reference substrate angle. In FIG. 5, the solid line of the antenna substrate 101 represents the antenna substrate 101 when the substrate inclination angle is set to $-\theta 1$ at which the measured result V3 is obtained. In FIG. 5, the dashed-dotted line of the antenna substrate 101 represents the antenna substrate 101 when the substrate inclination angle is set to $-(\theta 1+\theta 2)$ at which the measured result V4 is obtained.

Next, the controller 31 determines, based on the measured results V3 and V4, whether the difference of the measured result V4 from the measured result V3, which is represented by V3−V4, is greater than the predetermined determination threshold Vth in step S220. Note that the determination in step S220 is substantially identical to the determination in step S160.

If the determination is affirmative in step S220, it is determined that the actuator 103 is operating normally when the substrate inclination angle is at $-\theta 1$ or thereabout. Then, the controller 31 outputs, via the display unit 34, a checked result showing that the checked result is good, i.e. is OK, in step S230.

Specifically, it is determined that the actuator 103 is operating normally at the substrate inclination angle being set to each of $+\theta 1$ and $-\theta 1$ or therearound. This determination makes clear the operations of the actuator 103 are confirmed over the adjustment range of the substrate inclination angle from $-\theta 1$ to $+\theta 1$ inclusive. This is because the substrate inclination angle is, of course, changed from $+\theta 1$ to $+\theta 2$ or from $-\theta 1$ to $-\theta 2$ during the process between (i) The determination that the actuator 103 is operating normally at the substrate inclination angle being set to $+\theta 1$ (ii) The determination that the actuator 103 is operating normally at the substrate inclination angle being set to $-\theta 1$.

Otherwise, if the determination is negative in step S160 or S220, the controller 31 determines that the actuator 103 is operating abnormally when the substrate inclination angle is set to at least one of $-\theta 1$ and $-\theta 1$ or thereabout. Then, the controller 31 outputs, via the display unit 34, a checked result showing that the checked result is bad, i.e. is abnormal, in step S240.

After outputting the checked result in step S230 or S240, the controller 31 drives the rotator 2 to reset the housing inclination angle to the reference housing angle, and drives the actuator 103 to reset the substrate inclination angle to the reference substrate angle in step S250. Thereafter, the controller 16 terminates the task.

Advantageous Effects

As described above, the radar checking system according to the embodiment makes it possible to check whether the actuator 103 is operating normally over an operating range corresponding to an adjustment range without using an inclination sensor or the like that measures an inclination angle of the antenna substrate 101; the actuator 103 is capable of changing the inclination angle to thereby change the beam axis of the antenna transceiver surface 101a of the antenna substrate 101.

In addition, because measurement of received power is obtained only two times for each limit of the adjustment range, it is possible to efficiently perform the checking in a short time.

Other Embodiments

The embodiment of the present invention has been described, but the present invention is not limited to the embodiment. The present invention can be performed in various modifications.

For example, the controller 31 of the checking tool 3 performs the actuator checking task, but the signal processor 16 of the radar device 1 can be configured to perform the actuator checking task. In this modification, the checking tool 3 is configured to instruct the signal processor 16 to activate the actuator checking task, and to inform users of the checked result obtained from the signal processor 16.

In the embodiment, the transmitting antenna 11 and the receiving antenna 12 are formed on the common antenna substrate 101, but the receiving antenna 12 can be formed on another substrate. In this modification, electronically scanning the plurality of antenna elements of the receiving antenna 12 can determine the orientation of the radar beam to be received by the receiving antenna 12. Specifically, when the axis of the radar beam to be transmitted is set to be oriented to the specified direction, electronically scanning the plurality of antenna elements makes it possible to align the orientation of the radar beam to be received to be the specified direction.

REFERENCE SIGNS LIST

1 . . . Radar device 2 . . . Rotator 3 . . . Checking tool 4 . . . Reflector 11 . . . Transmitting antenna 12 . . . Receiving antenna 13 . . . Transceiver circuit 15 . . . Driver 16 . . . Signal processor 21 . . . Support 22 . . . Base 31 . . . Controller 32 . . . Communication interface (Communication I/F) 3 . . . Operation unit 34 . . . Display unit 101 . . . Antenna substrate 102 . . . Housing 103 . . . Actuator 104 . . . Biasing member

The invention claimed is:

1. A checking method for a radar device as a checking target, the radar device comprising:
an antenna substrate having a beam transmitting surface on which an antenna having a predetermined beam axis is formed;
a housing in which the antenna substrate is installed, the housing having a first reference surface having a predetermined positional relationship with respect to a predetermined checking reference surface, the housing supporting the antenna substrate such that a first inclination angle of the beam transmitting surface with respect to the first reference surface is changeable;
an actuator installed in the housing and configured to change the first inclination angle to change an orientation of the beam axis of the antenna along a direction defined relative to the checking reference surface; and
a measuring unit that transmits a radar beam via the beam transceiver surface of the antenna substrate, and receives a reflected beam based on the transmitted radar beam to measure received power,
the checking method checking whether the actuator operates over an operating range corresponding to a predetermined adjustment range for the first inclination angle, the checking method comprising:
a step of providing checking equipment comprising:
a housing support configured to:
support the housing such that a second inclination angle of the first reference surface with respect to a second reference surface is changeable, and
change the second inclination angle to change the orientation of the beam axis along a direction defined relative to the second reference surface,
the second reference surface being defined as a surface substantially parallel to the first reference surface when the first reference surface is substantially perpendicular to the checking reference surface; and
a reflector configured to reflect the transmitted radar beam and located to maximize the received power measured by the measuring unit based on a reflected radar beam when the beam axis of the radar device supported by the housing support is oriented to a specified direction,
a value of the first inclination angle, at which the beam axis is oriented to the specified direction when the second inclination angle is set to a predetermined reference housing angle, being defined as a reference substrate angle,
a value of the first inclination angle of the antenna substrate corresponding to a limit of the adjustment range being defined as a limit angle;
a first step of:
setting the second inclination angle of the housing to an angle different from the reference housing angle by the limit angle;
driving the actuator to set the first inclination angle to an angle different from the substrate inclination angle by the limit angle such that the beam axis is kept to be oriented to the specified direction; and
transmitting, by the measuring unit, a radar beam via the beam transceiver surface and receiving a reflected beam based on the transmitted radar beam to thereby measure first received power;
a second step of:
driving the actuator to set the first inclination angle to an angle located outside the adjustment range by a predetermined additional angle while the first inclination angle of the antenna substrate is maintained; and
transmitting, by the measuring unit, a radar beam via the beam transceiver surface and receiving a reflected beam based on the transmitted radar beam to thereby measure second received power; and
a third step of:
determining whether a difference between the first received power as a measurement result from the first step and the second received power as a measurement result from the second step is greater than a predetermined determination threshold; and
checking an operating state of the actuator based on a result of the determination.

2. The checking method according to claim 1, wherein:
the limit of the adjustment range consists of at least two limits, and
the checking method performs the first to third steps for each of the at least two limits.

3. A checking system for a radar device as a checking target, the radar device comprising:
an antenna substrate having a beam transmitting surface on which an antenna having a predetermined beam axis is formed;
a housing in which the antenna substrate is installed, the housing having a first reference surface having a predetermined positional relationship with respect to a predetermined checking reference surface, the housing supporting the antenna substrate such that a first inclination angle of the beam transmitting surface with respect to the first reference surface is changeable;
an actuator installed in the housing and configured to change the first inclination angle to change an orientation of the beam axis of the antenna along a direction defined relative to the checking reference surface; and
a measuring unit that transmits a radar beam via the beam transceiver surface of the antenna substrate, and receives a reflected beam based on the transmitted radar beam to measure received power,
the checking system checking whether the actuator operates over an operating range corresponding to a predetermined adjustment range for the first inclination angle, the checking system comprising:
a housing support configured to:
support the housing such that a second inclination angle of the first reference surface with respect to a second reference surface is changeable, and change the second inclination angle to change the orientation of the beam axis along a direction defined relative to the second reference surface,
the second reference surface being defined as a surface substantially parallel to the first reference surface when the first reference surface is substantially perpendicular to the checking reference surface;
a reflector configured to reflect the transmitted radar beam and located to maximize the received power measured by the measuring unit based on a reflected radar beam when the beam axis of the radar device supported by the housing support is oriented to a specified direction,
a value of the first inclination angle, at which the beam axis is oriented to the specified direction when the second inclination angle is set to a predetermined reference housing angle, being defined as a reference substrate angle,
a value of the first inclination angle of the antenna substrate corresponding to a limit of the adjustment range being defined as a limit angle;
a first measuring module that:
  sets the second inclination angle of the housing to an angle different from the reference housing angle by the limit angle;
  drives the actuator to set the first inclination angle to an angle different from the substrate inclination angle by the limit angle such that the beam axis is kept to be oriented to the specified direction; and
  transmits, by the measuring unit, a radar beam via the beam transceiver surface and receives a reflected beam based on the transmitted radar beam to thereby measure first received power;
a second measuring module that:
  drives the actuator to set the first inclination angle to an angle located outside the adjustment range by a predetermined additional angle while the first inclination angle of the antenna substrate is maintained; and
  transmits, by the measuring unit, a radar beam via the beam transceiver surface and receives a reflected beam based on the transmitted radar beam to thereby measure second received power; and
a checking module that:
  determines whether a difference between the first received power as a measurement result from the first step and the second received power as a measurement result from the second step is greater than a predetermined determination threshold; and
  checks an operating state of the actuator based on a result of the determination.

* * * * *